United States Patent [19]
Scales

[11] 3,951,438
[45] Apr. 20, 1976

[54] FASTENING MEANS
[75] Inventor: William Scales, Newcastle-upon-Tyne, England
[73] Assignee: Dunlop Limited, London, England
[22] Filed: June 28, 1974
[21] Appl. No.: 484,065

[30] Foreign Application Priority Data
July 6, 1973 United Kingdom............. 32373/73

[52] U.S. Cl.............................. 285/55; 285/247; 285/256; 285/259
[51] Int. Cl.²................... F16L 33/20; F16L 33/24
[58] Field of Search........... 285/247, 256, 259, 355, 285/55, 238, 239, 240, 241, 258, 242, 243, 244, 245, 246, 248, 249, 250, 149, 173, 253

[56] References Cited
UNITED STATES PATENTS

| | | | |
|---|---|---|---|
| 123,070 | 1/1872 | Allen | 285/259 X |
| 590,258 | 9/1897 | Dale | 285/259 X |
| 1,257,852 | 2/1918 | Hall | 285/55 |
| 1,808,094 | 6/1931 | Yackey | 285/55 |
| 1,810,268 | 6/1931 | Dold | 285/256 X |
| 1,839,338 | 1/1932 | Pentz | 285/55 X |
| 2,031,833 | 2/1936 | Hutchinson | 285/256 |
| 2,167,258 | 7/1939 | Wilson | 285/259 X |
| 2,481,001 | 9/1949 | Burckle | 285/256 X |
| 3,002,770 | 10/1961 | Chesnut et al. | 285/355 X |
| 3,101,207 | 8/1963 | Pavel et al. | 285/355 X |
| 3,177,016 | 4/1965 | Holmgren | 285/259 X |
| 3,578,360 | 5/1971 | Eliot | 285/55 |

FOREIGN PATENTS OR APPLICATIONS

| | | | |
|---|---|---|---|
| 667,181 | 2/1952 | United Kingdom | 285/256 |
| 984,749 | 3/1965 | United Kingdom | 285/256 |
| 1,393,884 | 2/1965 | France | 285/256 |

Primary Examiner—Thomas F. Callaghan
Attorney, Agent, or Firm—Stevens, Davis, Miller & Mosher

[57] ABSTRACT

A fastening means, such as a hose end fitting comprising a metallic member formed with a serrated surface, and a layer of polymeric material arranged to cover the serrated surface, the surface of the layer of polymeric material both facing and remote from the serrated surface being capable of conforming substantially to the shape of the serrated surface.

23 Claims, 5 Drawing Figures

FASTENING MEANS

This invention relates to fastening means and in particular, though not exclusively, to improved hose fastening means and hose assemblies including fastening means.

In many hose assemblies fastening means such as hose end fittings are secured to an end of a length of hose by being arranged to exert a compressive force on, and thereby grip, the wall of the hose. The end fitting may comprise tubular metal inner and outer members each formed with serrated surfaces, often of a relatively sharp profile following machining, for contact with inner and outer surfaces of the hose wall respectively and arranged to exert a compressive force on the material of the hose therebetween.

The operational life of hose assemblies of this and similar kinds is however limited, particularly when the hose is used to contain fluids which are caused to pulsate in pressure, since the resulting impulse loadings on the hose cause eventual failure of the hose by tearing, chafing and similar damage over that region where it is gripped by the sharp serrated surfaces of the fastening means.

One object of the present invention is to provide an improved fastening means.

According to one aspect of the present invention a fastening means comprises a metallic member formed with a serrated surface, and a layer of polymeric material arranged to cover the serrated surface, surfaces of the layer of polymeric material both facing and remote from the serrated surface being capable of conforming substantially to the shape of the serrated surface.

Preferably the layer of polymeric material is a layer of synthetic material such as a polyamide, polyethylene, acrylobutadiene styrene or polycarbonates, polypropylene material, and the layer preferably has a thickness of less than 0.050 inches so that both the said facing and remote surfaces may conform substantially to the profile of the serrations. Materials such as nylon 6 and nylon 66 are particularly suitable. The primary requirement for the layer of polymeric material, in addition to being capable of conforming substantially to the shape of the serrated surface, is that it is formed of a material which can substantially resist tearing, chafing and similar damage by the serrated surface.

The layer of polymeric material may be in the form of a coating applied to the serrated surface of the metallic member, for example by spraying or fusion coating, or it may be in the form of a thin sheet of film capable of conforming to the shape of the serrated surface under the action of compressive force resulting when the fastening means is arranged in gripping contact with a deformable member, the layer of polymeric material being disposed between the metallic member and the deformable member. The layer of polymeric material may, alternatively, be heat-set to conform to the shape of the serrated surface while in a mould, or bonded to the metal by the use of adhesive.

The layer of polymeric material may be formed with a flanged portion extending substantially perpendicular to the serrated surface of the metallic member and in particular in the case where the layer of polymeric material is in the form of a thin sheet the flanged portion may be arranged to abut an edge portion of a deformable member and assist in assembly of the metallic member and deformable member with the layer of polymeric material therebetween.

The metallic member may be a metallic member of a substantially tubular shape, for example that of a tubular hose end fitting, and in the case of a member of this or a similar shape the layer of polymeric material may be of substantially tubular or similar shape and caused to conform to the shape of the serrated surface as a result of stresses within the material of the sleeve, or the layer of polymeric material may be in the form of a coating.

The layer of polymeric material may be associated with radially inner or radially outer serrated surfaces of a tubular member such as a hose fitting and may also extend over non-serrated portions of a surface of a tubular member such as a hose fitting.

The fastening means may be provided with a rigid member spaced from the serrated surface of the aforementioned metallic member such that a deformable member may be secured therebetween, and the rigid member may constitute a second metallic member formed with a serrated surface. In the latter case a layer of polymeric material for example of similar form to that covering said aforementioned metallic member, may be arranged to cover the serrated surface of the second metallic member.

Where two metallic members with serrated surfaces are provided, the serrated surfaces may be arranged to co-operate over at least a portion of each of their surfaces to assist in locating said members in position relative to each other against forces acting in the plane of said surfaces.

In addition to hose fittings the invention is applicable also to other fastening means such as, for example, connectors for lengths of conveyor belting, and hinges for rubber doors.

According to another aspect of the present invention there is provided an assembly comprising fastening means secured relative to a deformable member, the fastening means comprising a metallic member having a serrated surface and a layer of polymeric material, the surfaces of which both facing and remote from the serrated surface conform substantially to the shape of the serrated surface, being disposed between the metallic member and the deformable member.

Preferably the layer of polymeric material is of greater resilience, i.e. higher modulus, ductility and tensile strength, than the material of the deformable member, but in the case where the deformable member is a strong and tough material itself the layer of polymeric material need not be of a material having greater resilience.

The deformable member may be formed of polymeric material in which is embedded a reinforcing structure, and in this case the polymeric material may be cut back to reveal the reinforcing structure in the vicinity of the metallic member, or otherwise constructed in this form such as by moulding, so that the reinforcing structure is in direct contact either with the layer of polymeric material covering a serrated surface or with a rigid member spaced from the serrated surface.

When the assembly comprises a hose and hose end fitting or some similar arrangement the layer of polymeric material may be disposed adjacent either a radially inner or a radially outer surface of the hose.

When the hose end fitting comprises inner and outer members each formed with serrated surfaces a layer of polymeric material may be disposed between either one or both of said members and the hose. In arrangements where a layer of polymeric material is provided between the hose and one member only of inner and outer members of a hose end fitting the surface of the other member whether serrated or not may be arranged in direct contact with resilient deformable material from which the hose is built, or said resilient material may, in the case of reinforced hose, be cut back or otherwise formed so that the direct contact is made with the reinforcement of the hose.

Two embodiments of the invention will now be described, by way of example, with reference to the accompanying drawings in which.

Figure 1:
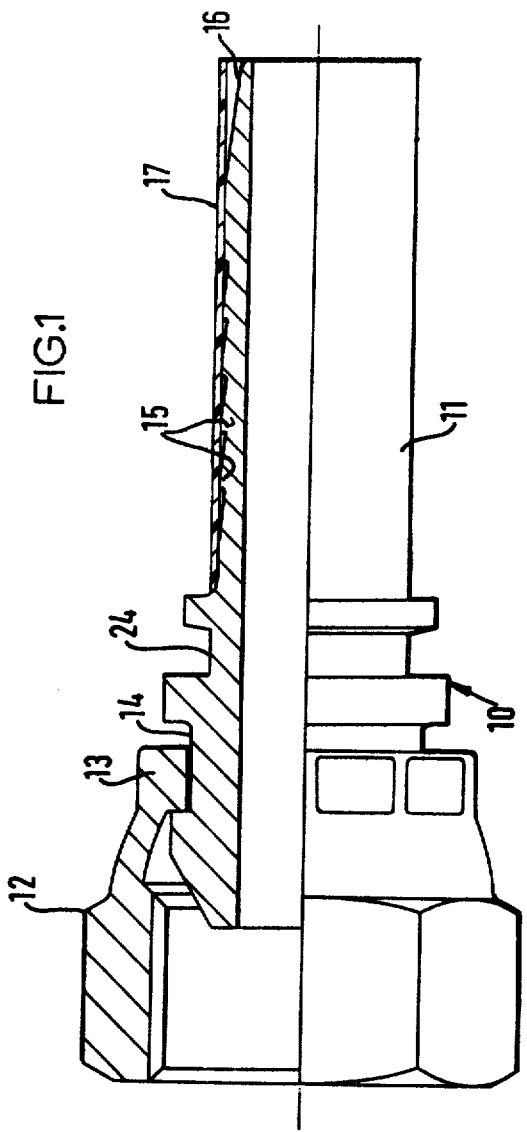
FIG. 1 shows a longitudinal view, part in section, of a hose end fitting insert.

A metal hose end fitting inner member 10, illustrated in FIG. 1 of the accompanying drawings, is formed with an insert portion 11 for fitting into the bore of a hose and has associated therewith a captive nut member 12 rotatable relative to the portion 11 and freely retained relative thereto by a ring portion 13 of the nut member situated within an annular recess 14 formed in an end region of the insert portion 11. The radially outer surface of the insert portion 11 is formed with a plurality of circumferentially extending serrations 15 of sawtooth profile and the free end of the insert portion furthest from the annular recess 14 is formed with a tapered serration free surface 16. A thin cylindrical polyamide sleeve 17 having a thickness in the order of 0.013 inches extends over the insert portion in contact with the tips of the serrations.

Figure 2:
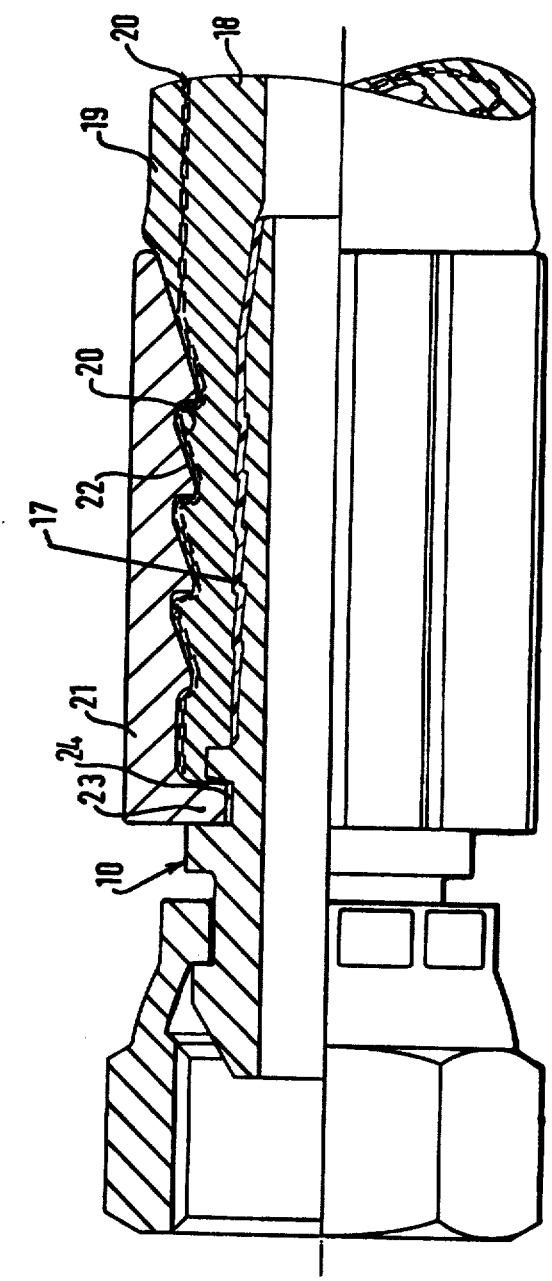
FIG. 2 shows a longitudinal view, part in section, of a hose end assembly incorporating the insert shown in FIG. 1.

Prior to assembly of the end fitting inner member 10 into the end of a hose, an end of a hose 18 (see FIG. 2) is prepared by cutting back the outer rubber layer 19 of the hose so as to expose the wire braid reinforcement layer 20 of the hose. A swageable hose end fitting outer member 21 having a serrated radially inner surface 22 is then fitted over the exposed wire reinforcement layer 20 in contact therewith.

Assembly of the hose and inner and outer members of the end fitting is effected by urging the inner member 10, carrying its thin sleeve 17 into the bore of the hose. The outer portion 21 is then swaged radially inwards so that it compresses the hose between the inner and outer members 10, 21. When swaged, a radially inwardly extending lip member 23 at an end of the outer member 21 engages an annular recess 24 formed in the inner member 10 and thereby locates the two members relative to each other in the direction of the length of the hose.

In the final assembly the thin sleeve 17 of polyamide material conforms substantially on both its radially inner and outer surfaces to the serrated profile of the end fitting insert member under the action of the compressive forces exerted by the inner and outer portions of the end fitting. It thereby ensures that a good grip is exerted between the hose and the end fitting in the direction of the length of the hose.

The thin sleeve substantially reduces any tendency for tearing, chafing and similar damage of the end of the hose when subjected to impulse forces arising from pulsating pressures in fluids carried by the hose as compared with an assembly in which no such sleeve is present and the sharp edges at the tips of the profile end are free to cut into the material of the hose.

Figure 5:
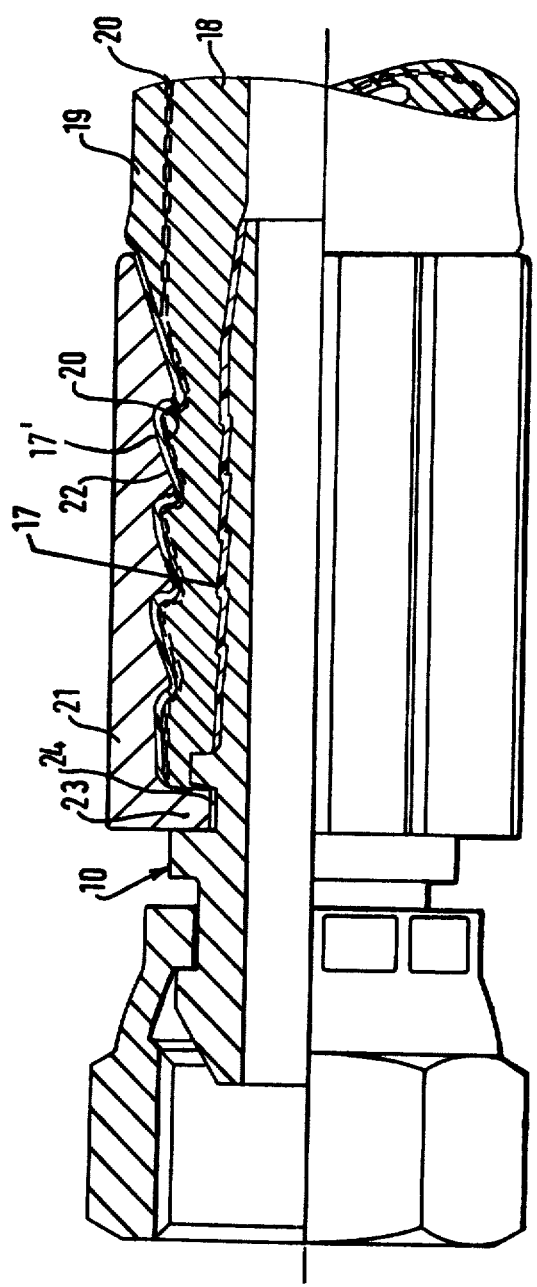
FIG. 5 shows a longitudinal view, part in section, of another embodiment of hose assembly incorporating the insert in FIG. 1.

The sleeve has the further feature of substantially minimizing the tendency for cutting and tearing during compressing of the hose wall as the outer member of the end fitting is swaged radially inwardly. The serrations of the outer member bear directly on the wire reinforcement and are thereby prevented from cutting directly into the elastomeric material of the hose. In an alternative embodiment shown in FIG. 5 a second sleeve or layer 17' of polymeric material covers the serrations of the outer member.

The thin sleeve, although adjacent the hose body, is not subjected to the full tensile forces produced in the hose during impulse conditions and therefore the wear rate between the sleeve and insert is less than would occur if the hose body were in direct contact with the insert irrespective of whether or not the sleeve is of a more resilient material than the hose body.

Figure 3:
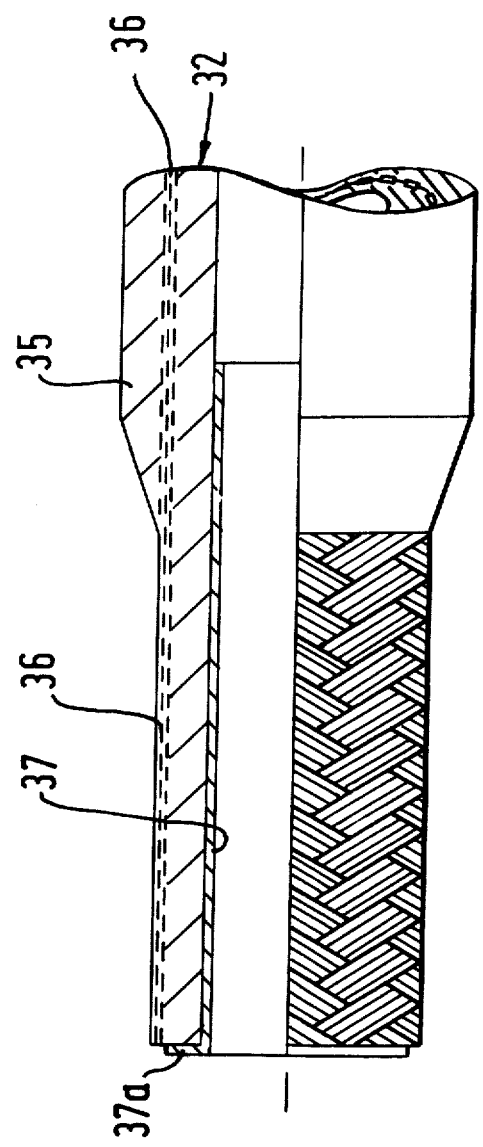
FIG. 3 shows a longitudinal view, part in section, of an end portion of a hose prepared to receive a hose end fitting.
Figure 4:
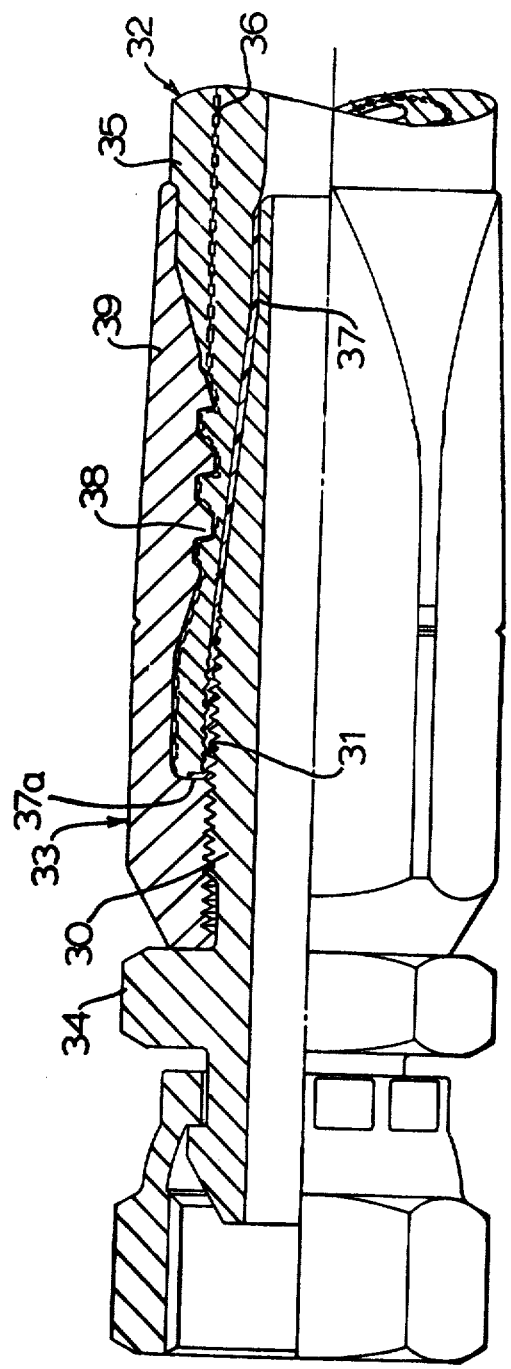
FIG. 4 shows a longitudinal view, part in section, of a hose assembly comprising an end fitting fastened to the hose end shown in FIG. 3.

In a second embodiment of the invention, illustrated in FIGS. 3 and 4 of the accompanying drawings, an insert portion 30 of a hose end fitting is constructed substantially similar to the insert member described in respect of the preceding embodiment of the invention except that the plurality of circumferentially-extending serrations are replaced by a screw thread 31 formed on an outer surface of the insert portion.

In addition to providing means by which a substantial grip may be exerted indirectly on the end of a hose 32 the screw thread serration serves also to secure the hose end fitting outer member 33 relative to the inner member 34 at the outer end of the hose.

Prior to assembly of a hose and end fitting, an end of the hose is prepared by cutting back an outer rubber layer 35 of the hose (see FIG. 3) so as to expose a braided reinforcement layer 36 of the hose and a flanged polyamide sleeve 37 is inserted within the bore of the hose, with the flange portion 37a adjacent the end of the hose.

An outer member 33 of the end fitting is then pushed over the end of the hose with serrations 38 on the radially inner surface of the member 39 in contact with the exposed portion of the braided reinforcement. The inner member 34 of the end fitting is then screwed into the hose bore into position relative to the outer member 33, causing the hose material and the sleeve 37 therebetween to be compressed as the tapered portion of the inner member advances into the bore of the hose.

The provision of a layer of polymeric material adjacent a serrated surface as hereinbefore described assists substantially in reducing the rate of deterioration and tendency for tearing of a deformable member where gripped by a serrated surface, and the need to perform costly finishing operations to remove sharp machining marks from a serrated surface is, in general, avoided.

The use of a layer of polymeric material also obviates the need to use for formation of the deformable member a rubber compound or other material selected primarily on the basis of the ability of the compound or material to resist tearing, chafing and similar damage. In consequence of the use of a tear-resisting intermediate layer of polymeric material, the compound or material of the deformable member may be selected primarily for other properties, such as corrosion and abrasion resistance, which affect the life of the assembly and without undue restriction to properties required to effect attachment to an end fitting.

Having now described my invention — what I claim is:

1. A hose assembly capable of operating in pulsating pressure conditions, comprising: a hose; hose fastening means attached to an end portion of the hose and including a metallic member having a serrated surface, said serrated surface having a plurality of inclined serrations which are shaped to resist removal of the hose from the metallic member; and a thin annular first layer of polymeric material disposed between the hose and the serrated surface of the metallic member and extending along the serrated surface and only along the attached end portion of the hose, the thin layer of polymeric material being subject to compression forces between the hose and the metallic member, and inner and outer surfaces of the layer conforming, adjacent both the hose and the metallic member, substantially to the shape of the serrated surface.

2. An assembly according to claim 1 wherein the layer of polymeric material comprises a thin sheet of material disposed adjacent to the serrated surface.

3. An assembly according to claim 2 wherein the layer of polymeric material is secured to the serrated surface of the metallic member by the use of adhesives.

4. An assembly according to claim 1 wherein the layer of polymeric material comprises a coating of polymeric material on the serrated surface of the metallic member.

5. An assembly according to claim 4 wherein the coating is a spray-coating.

6. An assembly according to claim 4 wherein the polymeric material is a fusion coating.

7. An assembly according to claim 1 wherein the layer of polymeric material has a thickness less than 0.050 inches (1.26 mm).

8. An assembly according to claim 1 wherein the layer of polymeric material covers additionally a non-serrated portion of the surface of the metallic member.

9. An assembly according to claim 1 wherein a rigid member is provided spaced from the serrated surface of the metallic member such that the hose is secured therebetween.

10. An assembly according to claim 9 wherein the rigid member includes a second metallic member having a serrated surface on that surface facing the first metallic member.

11. An assembly according to claim 10 wherein a second layer of polymeric material covers the serrated surface of said second metallic member.

12. An assembly according to claim 11 wherein the second layer of polymeric material covering the serrated surface of said second metallic member is a layer of polymeric material which conforms substantially to the shape of the serrated surface of said second metallic member.

13. An assembly according to claim 10 wherein the serrated surfaces of the first and second metallic members co-operate over at least a portion of each of the serrated surfaces to assist in locating said first and second members in position relative to each other against forces acting in the plane of said serrated surfaces.

14. An assembly according to claim 1 wherein the layer of polymeric material includes a flanged portion extending substantially perpendicular to the serrated surface of the metallic member.

15. An assembly according to claim 1 wherein the metallic member is of a substantially tubular shape having at least one of its substantially cylindrical surfaces as the serrated surface.

16. An assembly according to claim 15 wherein the serrated surface is on a radially inner surface of the tubular metallic member.

17. An assembly according to claim 15 wherein the serrated surface is on a radially outer surface of the tubular metallic member.

18. An assembly according to claim 15 wherein at least a portion of the tubular metallic member having the serrated surface is tapered.

19. An assembly according to claim 1 wherein the layer of polymeric material is of a higher resilience than the hose.

20. An assembly according to claim 1 wherein the hose comprises polymeric material in which is embedded a reinforcing structure.

21. An assembly according to claim 20 wherein the reinforcing structure is in direct contact with the layer of polymeric material being subject to compression forces between the hose and the metallic member.

22. An assembly according to claim 20 wherein the reinforcing structure is in direct contact with a rigid member spaced from the serrated surface of the metallic member.

23. An assembly according to claim 1 wherein said first metallic member is tubular and further comprising a second tubular metallic member, said first and second tubular members being swaged to secure the hose therebetween.

* * * * *